United States Patent [19]
Shimaya et al.

[11] Patent Number: 5,184,983
[45] Date of Patent: Feb. 9, 1993

[54] FLOATING PREVENTIVE STRUCTURE FOR SHOE OF TENSIONER LEVER

[75] Inventors: Kazuhiko Shimaya, Hidaka; Masaki Miyaji, Hanno, both of Japan

[73] Assignee: Tsubakimoto Chain Co., Osaka, Japan

[21] Appl. No.: 867,861

[22] Filed: Apr. 13, 1992

[30] Foreign Application Priority Data

Apr. 11, 1991 [JP] Japan .................................. 3-32352

[51] Int. Cl.[5] .................................. F16H 7/00
[52] U.S. Cl. .................................. 474/111; 474/140
[58] Field of Search .................. 474/101, 109–111, 474/113–117, 133–138, 140

[56] References Cited

U.S. PATENT DOCUMENTS

| | | | |
|---|---|---|---|
| 4,713,043 | 12/1987 | Biedermann | 474/111 |
| 4,826,468 | 5/1989 | Friedrichs | 474/140 X |
| 4,832,664 | 5/1989 | Groger et al. | 474/111 |

Primary Examiner—Thuy M. Bui
Attorney, Agent, or Firm—Howson & Howson

[57] ABSTRACT

A tensioner lever for applying tension to an endless chain, belt or the like comprises an elongated arm and a plastic shoe, having at least one L-shaped element engaging both the back face and one side edge of the arm, at least one projection engaging the opposite side edge of the arm, and a U-shaped end hook engaging an end of the arm.

1 Claim, 6 Drawing Sheets

FLOATING PREVENTIVE STRUCTURE FOR SHOE OF TENSIONER LEVER

BRIEF DESCRIPTION OF THE INVENTION

This invention relates to tensioners of the type which are used to control tension in endless power transmission such as chains and belts. The invention relates more particularly to improvements in the tensioner lever which is interposed between a hydraulic piston and the chain or belt, and specifically to an improved structure which prevents a chain or belt-engaging shoe from floating away from the arm of a tensioner lever during operation.

Tensioners of the kind to which the invention relates have many applications. A typical application is the maintenance of tension in then timing belt of an internal combustion engine, i.e. the belt which connects a valve-opening camshaft to the crankshaft.

It is conventional practice to apply a predetermined tension to a power transmission chain or belt in order to prevent skipping of the chain or belt over sprocket teeth, or to prevent slipping in the case of a smooth belt. A typical tensioner assembly comprises a lever pivoting about a pin projecting from a fixed member, and a piston and cylinder mechanism which applies a force to the lever, causing the lever to bear against the chain or belt. The piston is typically urged in the projecting direction by a compressed spring. In a form of tensioner known as a hydraulic tensioner, a hydraulic fluid allows the piston to project rapidly in order to apply a tensioning force quickly when slack is encountered, and causes the piston to withdraw slowly when excess tension is encountered.

A conventional tensioner lever comprises an elongated arm having a front face, and a shoe, on the front face of the arm, for contacting the chain or belt. A pad located on the opposite face of the arm, contacts the tensioner. The shoe of the conventional tensioner lever snaps onto the side edges of the arm and hooks onto one end of the arm. The direction of movement of the chain or belt is such that it travels from the end of the arm on which the shoe is hooked, and along the shoe toward the opposite end of the arm.

In the prior art described above, the end hook of the shoe holds the shoe in position with respect to the arm against movement in the direction of movement of the chain or belt. In addition, the snaps of the shoe hold the shoe in position with respect to the arm in a direction lateral to the path of the chain or belt. However, there is no provision in the conventional tensioner for preventing the shoe from floating away from the face of the arm. Therefore, vibration of the chain or belt will cause the shoe to flap on and off the front face of the arm. The floating movement of the shoe generates noise and detracts from the overall stability of the chain or belt. Further, the floating movement can damage the shoe.

It is an object of this invention to prevent the shoe of a tensioner lever from floating away from the front face of the arm. Other objects of this invention include eliminating the noise created by the floating movement of the shoe, stabilizing the movement of the chain, and reducing or eliminating damage to the shoe.

The invention addresses these objects by providing a tensioner lever shoe with one or more L-shaped elements which engage the front and back faces as well as one side edge of the arm. The shoe also has one or more projections which engage the opposite side edge of the arm. A U-shaped end hook is incorporated into the shoe to engage one end of the arm. The direction of movement of the chain or belt is such that it travels from one end of the arm which the shoe is hooked, along the shoe, and toward the opposite end of the arm.

With the improved shoe structure as described above, the U-shaped end hook of the shoe holds the shoe against movement with respect to the arm in a direction corresponding to that of the movement of the chain or belt. The shoe's L-shaped elements and projections hold the shoe against movement with respect to the arm in directions lateral to the plane of movement of the chain or belt. In addition, the L-shaped elements of the improved shoe structure prevent the shoe from moving away from the face of the arm. Therefore, vibration of the chain or belt cannot cause the shoe to float away from the front face of the arm.

These and other objects, features and advantages of the invention will become apparent from the following detailed description when read in conjunction with the accompanying drawings.

DETAILED DESCRIPTION

Figure 6:
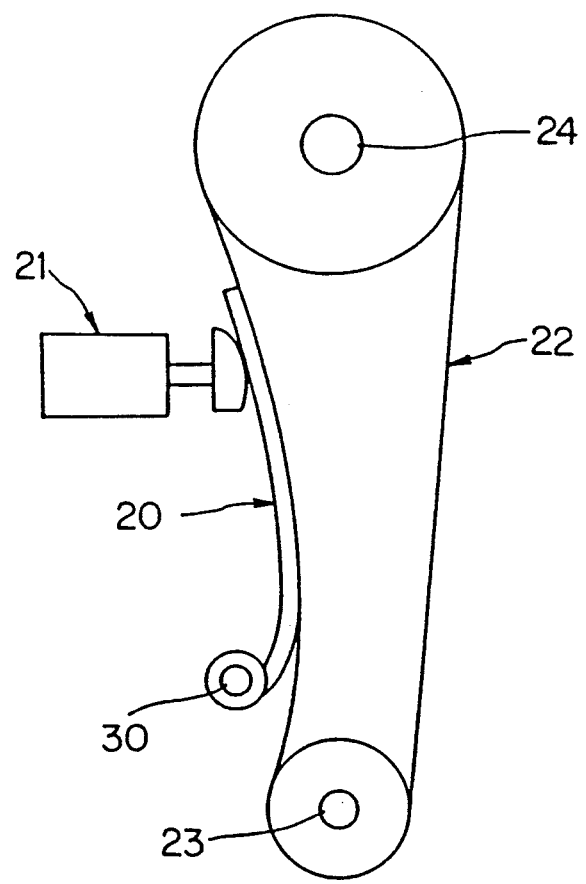
FIG. 6 is a schematic view illustrating the use of a tensioner lever in transmitting power between two rotating shafts in accordance with the prior art.

FIG. 6 shows a tensioner 21 applying pressure to a tensioner lever 20 which bears against a chain 22 to prevent the chain from vibrating. Chain 22 serves as an endless power transmission means for transmitting the rotation of a crankshaft 23 to a cam shaft 24. Lever 20 is tilted about a pin 30 projecting from a fixed member (not shown), typically a part of an engine block or a bracket mounted thereon.

Figure 7:
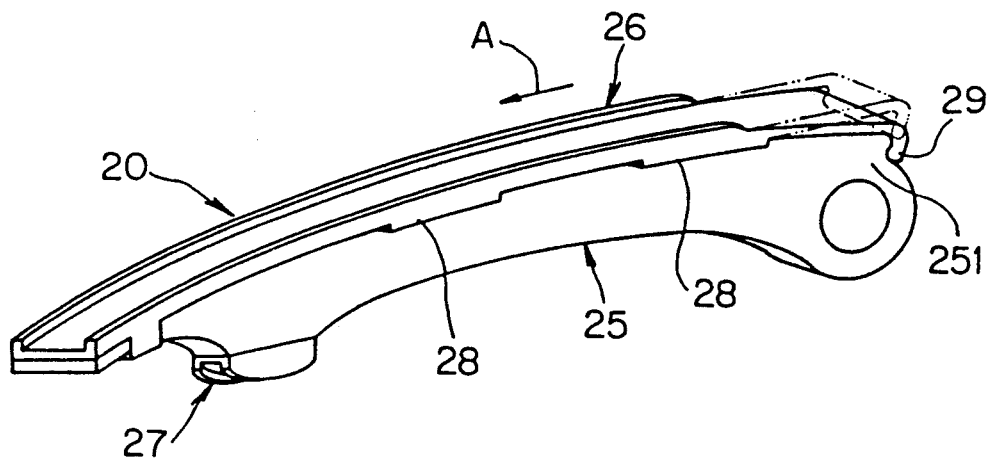
FIG. 7 is a perspective view of a typical tensioner lever according to the prior art.
Figure 8:
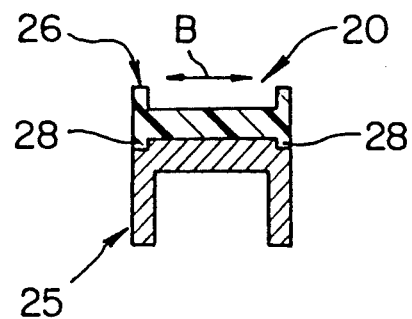
FIG. 8 is a cross-sectional view of a tensioner lever according to the prior art.

As shown in FIGS. 7 and 8, conventional tension lever 20 comprises a metal arm 25, a shoe 26 of synthetic resin, and a pad 27. Shoe 26 is mounted on the front face 253 of arm 25 and provides a surface for contacting the chain or belt as it slides past the lever. Pad 27 is connected to the back face of arm 25 and provides a surface for engagement with the moving member of a tensioner. Shoe 26, made of a synthetic resin, includes a pair of snap elements 28 which engage recesses formed where the sides of arm 25 meet the front face of the arm. A U-shaped end hook 29 formed on shoe 26, engages end 251 of arm 25.

Shoe 26 of the conventional tensioner lever 20 is held in position with respect to arm 25, by U-shaped end hook 29, against movement in direction "A", as shown in FIG. 7 corresponding to the direction of travel of the chain or belt. FIG. 8 shows shoe 26 held in position by elements 28 against lateral movement with respect to arm 25 in direction "B". The conventional tensioner lever 20 cannot prevent shoe 26 from floating, in direction "F", away from front face 253 of arm 25.

As shown in FIGS. 1 through 5, tensioner lever 40, which is in accordance with the invention, comprises an aluminum arm 41 having an I-shaped cross-section, a plastic shoe 42 and a pad 43. Arm 41 has an aperture 412 to receive a pin (not shown) about which the tensioner lever 40 is pivoted. Arm 41 has a first end 411 which engages a U-shaped end hook 55 of shoe 42. Shoe 42 is formed with L-shaped elements 51, 52 and 53 on one side and with an additional L-shaped element 56 positioned on the opposite side near the end remote from hook 55. L-shaped elements 51, 52, 53 and 56 engage a flange 44 of an arm 41. A projection 54 of the shoe 42 engages a notch 57, shown in FIG. 5, on the opposite side of the arm 41 with respect to L-shaped elements 51, 52 and 53.

Figure 1:
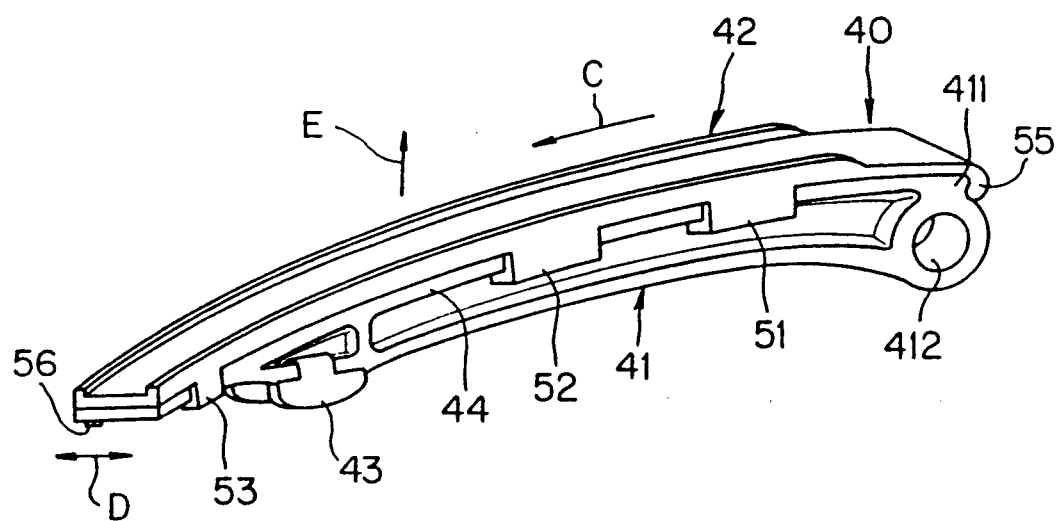
FIG. 1 is a perspective view of a tensioner lever according to the invention.
Figure 2:
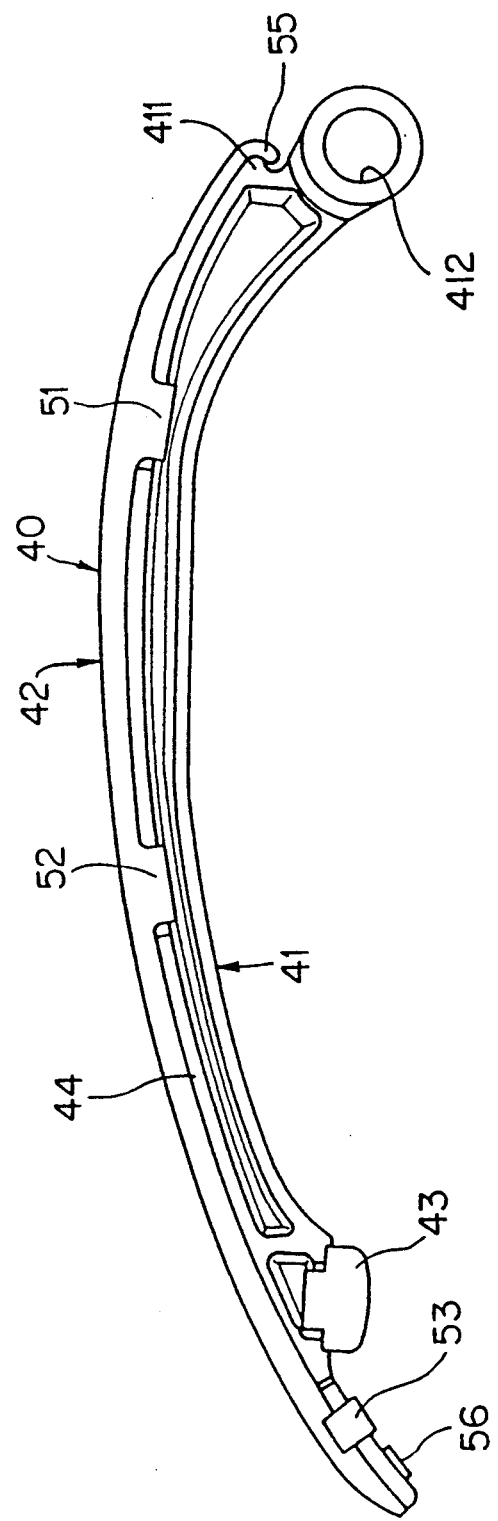
FIG. 2 is a side elevation of the tensioner lever of FIG. 1.
Figure 3:
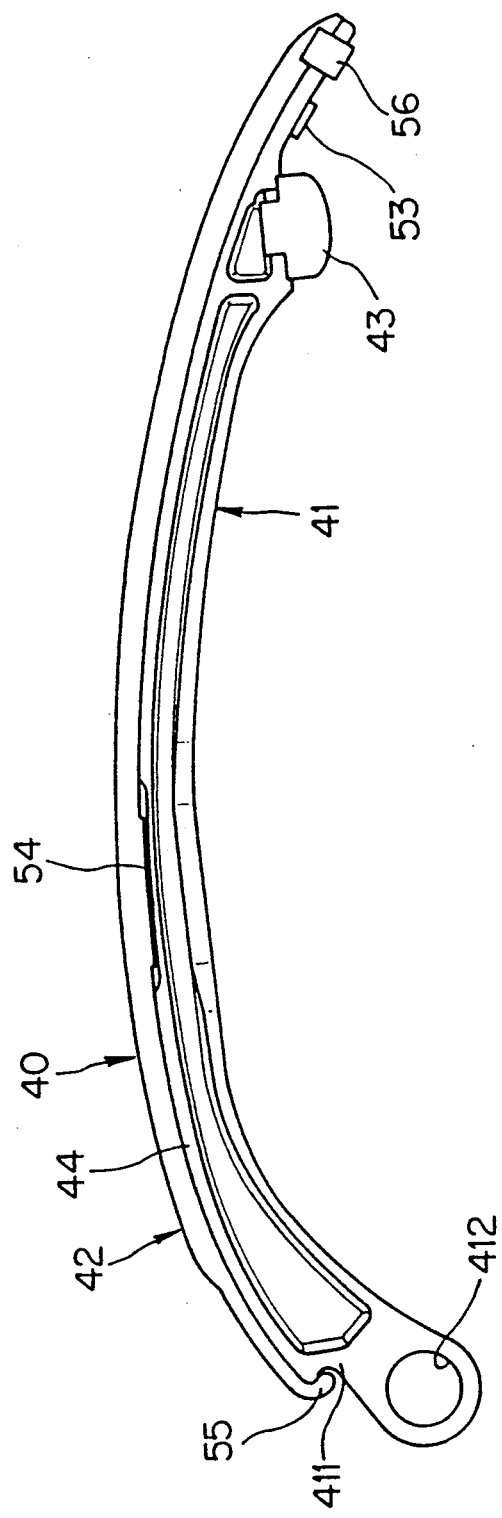
FIG. 3 is an elevation showing the opposite side of the lever of FIG. 2.

Shoe 42 is held in position with respect to arm 41 by the U-shaped end hook 55 against movement in direction "C" as indicated in FIG. 1. Direction "C" corresponds to the direction of travel of the chain or belt. Shoe 42 is held against lateral movement, in direction "D" as indicated in FIG. 1, by L-shaped elements 51, 52, 53 and 56, and by projection 54. Floating of the shoe 42 in direction "E", as indicated in FIG. 1, is prevented by the L-shaped elements 51, 52, 53 and 56, which also engage the back side of flange 44.

Figure 4:
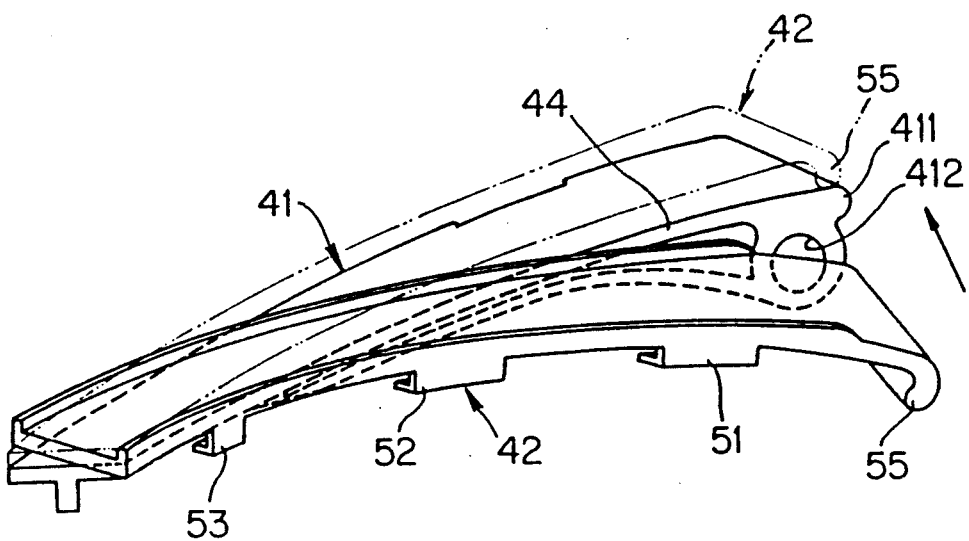
FIG. 4 is a perspective view illustrating the mounting of the shoe onto the arm of the tensioner lever.
Figure 5:
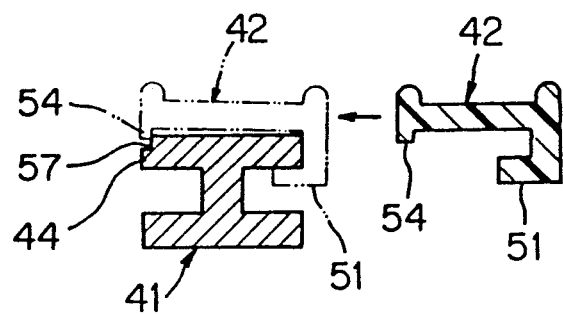
FIG. 5 is a cross sectional view illustrating the mounting of the shoe onto the arm of a tensioner lever.

FIGS. 4 and 5 illustrate the mounting of shoe 42 onto the arm 41. A free end of arm 41 is obliquely inserted between L-shaped elements 53 and 56 (the latter being shown in FIGS. 1 and 3). Then, L-shaped elements 52 and 51 are engaged with flange 44 and projection 54 (FIG. 3) is engaged with a notch 57 on flange 44. Finally end hook 55 is brought into engagement with end 411 on the arm.

FIG. 5 shows the I-shaped cross section of arm 41. The relationship of projection 54, L-shaped element 51, notch 57, flange 44, and front face 413 of arm 41, is also illustrated in FIG. 5.

The shoe is effectively prevented from moving away from the face of the arm, in direction E as shown in FIG. 1, by side-engaging elements 51, 52 and 53. This prevents flapping motion of the shoe on the arm and eliminates the resulting noise, stabilizes movement of the chain or belt, and reduces damage to the shoe, thereby prolonging its useful life.

Various modifications can be made in the invention described. For example, while L-shaped element 56, near the trailing end of the shoe, is desirable, it can be eliminated. Furthermore, the number of L-shaped elements corresponding to elements 51, 52, and 53, and the number of edge engaging elements corresponding to element 54, can be varied. These and other modifications, which will occur to persons skilled in the art, can be made without departing from the scope of the invention as defined in the following claim.

We claim:

1. A tensioner lever for applying tension to an endless power transmission in the form of a chain, belt or the like, comprising:
   (a) an elongated arm having a front face and a back face, both extending from a first end toward a second end, said first and second ends being positioned so that said endless power transmission passes adjacent to said front face in a direction from said first end toward said second end, and first and second side edges extending longitudinally along said elongated arm; and
   (b) shoe means positioned on said front face of said elongated arm and providing a surface against which said endless power transmission is slidable, said shoe having at least one L-shaped element engaging both said back face and one of said side edges of said arm, at least one projection engaging the opposite side of said arm, and a U-shaped end hook engaging said first end of said arm;

whereby said shoe is held in position with respect to said arm against movement in the direction of movement of said endless power transmission by said U-shaped end hook, held against movement in direction lateral to movement of said endless power transmission by said projection and L-shaped element, and held against movement in a direction away from said front face of said elongated arm by said L-shaped element.

* * * * *

UNITED STATES PATENT AND TRADEMARK OFFICE
CERTIFICATE OF CORRECTION

PATENT NO. : 5,184,983
DATED : February 9, 1993
INVENTOR(S) : Kazuhiko Shimaya; Masaki Miyaji It is certified that error appears in the above-identified patent and that said Letters Patent is hereby corrected as shown below:

Column 1, line 17, "then" should read --the--.

Column 4, line 34, after "opposite side" insert --edge--.

Signed and Sealed this

Eighteenth Day of January, 1994

Attest:

BRUCE LEHMAN

*Attesting Officer*    *Commissioner of Patents and Trademarks*